United States Patent
Abulafia et al.

(10) Patent No.: US 10,558,967 B2
(45) Date of Patent: *Feb. 11, 2020

(54) MOBILE PHONE PAYMENT SYSTEM USING INTEGRATED CAMERA CREDIT CARD READER

(71) Applicant: Jumio Corporation, Palo Alto, CA (US)

(72) Inventors: David Abulafia, Raanana (IL); Eyal Cohen, Raanana (IL)

(73) Assignee: Jumio Corporation, Palo Alto, CA (US)

( * ) Notice: Subject to any disclaimer, the term of this patent is extended or adjusted under 35 U.S.C. 154(b) by 952 days.

This patent is subject to a terminal disclaimer.

(21) Appl. No.: 15/005,836

(22) Filed: Jan. 25, 2016

(65) Prior Publication Data
US 2016/0140536 A1 May 19, 2016

Related U.S. Application Data

(63) Continuation of application No. 12/502,269, filed on Jul. 14, 2009, now Pat. No. 9,269,010.
(Continued)

(51) Int. Cl.
*G06Q 20/32* (2012.01)
*G06K 9/20* (2006.01)
(Continued)

(52) U.S. Cl.
CPC .......... *G06Q 20/32* (2013.01); *G06K 9/20* (2013.01); *G06K 9/2054* (2013.01); *G06K 9/228* (2013.01);
(Continued)

(58) Field of Classification Search
USPC .......................................... 235/380; 382/321
See application file for complete search history.

(56) References Cited

U.S. PATENT DOCUMENTS 6,128,398 A    10/2000  Kuperstein et al.
6,201,548 B1 *  3/2001  Cariffe ................. G06T 11/60
                                                 345/620
(Continued)

FOREIGN PATENT DOCUMENTS

CN        101022489 A    8/2007
KR       2002-0011052 A  2/2002
(Continued)

OTHER PUBLICATIONS

Abulafia, FinalOffice Action, U.S. Appl. No. 15/059,767, dated Nov. 23, 2016, 7 pgs.
(Continued)

*Primary Examiner* — Jay Huang
(74) *Attorney, Agent, or Firm* — Morgan, Lewis & Bockius LLP (57) ABSTRACT

A system and a method for conducting credit card transactions through a mobile device of a user. The mobile device comprises an image acquisition unit and a mobile application operated by the mobile device. The system enables acquiring an image of a client's credit card, using the image acquisition unit; analyzing data of the image; outputting details of the credit card from the analysis; verifying the output details, wherein the verification is further carried out through the mobile application; verifying authorization of inputted monetary transaction, wherein the mobile application enables verifying the authorization by communicating with the billing center, associated with at least one credit company associated with the credit card over at least one communication network, wherein the communication is carried out by the mobile application using the mobile device; and conducting monetary transactions using the verified credit card details.

20 Claims, 8 Drawing Sheets

Related U.S. Application Data (60) Provisional application No. 61/134,665, filed on Jul. 14, 2008.

(51) Int. Cl.

| | | |
|---|---|---|
| *G06K 9/22* | (2006.01) | |
| *G06Q 20/40* | (2012.01) | |
| *H04M 1/725* | (2006.01) | |
| *G06Q 40/00* | (2012.01) | |
| *G06K 9/34* | (2006.01) | |
| *G06K 9/46* | (2006.01) | |
| *G06Q 20/14* | (2012.01) | |
| *G06Q 20/24* | (2012.01) | |
| *H04M 17/00* | (2006.01) | |

(52) U.S. Cl.
CPC ............ *G06K 9/344* (2013.01); *G06K 9/46* (2013.01); *G06Q 20/14* (2013.01); *G06Q 20/24* (2013.01); *G06Q 20/327* (2013.01); *G06Q 20/40* (2013.01); *G06Q 20/409* (2013.01); *G06Q 40/12* (2013.12); *H04M 1/72522* (2013.01); *G06K 2209/01* (2013.01); *H04M 2017/2525* (2013.01); *H04M 2250/14* (2013.01); *H04M 2250/52* (2013.01)

(56) References Cited

U.S. PATENT DOCUMENTS

| | | | |
|---|---|---|---|
| 6,873,715 B2 | 3/2005 | Kuo et al. | |
| 7,118,032 B2 | 10/2006 | Elliot et al. | |
| 7,143,942 B2* | 12/2006 | Yamanaka | G06K 7/0004 235/454 |
| 7,653,183 B2 | 1/2010 | Patel et al. | |
| 7,802,720 B2 | 9/2010 | Yang | |
| 8,577,810 B1 | 11/2013 | Dalit et al. | |
| 8,995,774 B1 | 3/2015 | van Deventer et al. | |
| 8,997,195 B1 | 3/2015 | Fadida et al. | |
| 9,225,700 B1 | 12/2015 | Dotan et al. | |
| 9,305,230 B2 | 4/2016 | Abulafia et al. | |
| 9,760,788 B2 | 9/2017 | Shustorovich et al. | |
| 9,996,684 B2 | 6/2018 | Hoyos et al. | |
| 10,176,371 B2 | 1/2019 | Mattes | |
| 2002/0065728 A1* | 5/2002 | Ogasawara | G06Q 20/208 705/23 |
| 2003/0173401 A1* | 9/2003 | Yamagami | G06Q 10/08 235/380 |
| 2004/0107170 A1* | 6/2004 | Labrou | G06Q 20/02 705/64 |
| 2005/0009564 A1 | 1/2005 | Hayaashi et al. | |
| 2005/0093999 A1 | 5/2005 | Yamaya | |
| 2005/0247797 A1 | 11/2005 | Ramachandran | |
| 2006/0129485 A1* | 6/2006 | Hamzy | G06Q 20/102 705/40 |
| 2006/0144925 A1 | 7/2006 | Jones | |
| 2006/0237530 A1* | 10/2006 | Elliot | G06K 7/10881 235/380 |
| 2007/0036398 A1 | 2/2007 | Chen | |
| 2007/0156592 A1 | 7/2007 | Henderson | |
| 2008/0040278 A1 | 2/2008 | DeWitt | |
| 2008/0298588 A1* | 12/2008 | Shakkarwar | G06Q 20/02 380/255 |
| 2009/0110279 A1* | 4/2009 | Jain | G06F 17/243 382/176 |
| 2009/0173784 A1 | 7/2009 | Yang | |
| 2009/0234773 A1 | 9/2009 | Hasson | |
| 2009/0309698 A1 | 12/2009 | Headley et al. | |
| 2009/0328166 A1 | 12/2009 | Burch et al. | |
| 2010/0008535 A1 | 1/2010 | Abulafia | |
| 2010/0078472 A1 | 4/2010 | Lin et al. | |
| 2010/0171826 A1 | 7/2010 | Hamilton et al. | |
| 2011/0276484 A1 | 11/2011 | Pearson et al. | |
| 2011/0302645 A1 | 12/2011 | Headley | |
| 2012/0167185 A1 | 6/2012 | Menezes et al. | |
| 2013/0051632 A1 | 2/2013 | Tsai et al. | |
| 2013/0204786 A1 | 8/2013 | Mattes et al. | |
| 2014/0040989 A1 | 2/2014 | Davies et al. | |
| 2014/0052636 A1 | 2/2014 | Mattes | |
| 2014/0115708 A1 | 4/2014 | Terwilliger et al. | |
| 2015/0278593 A1 | 10/2015 | Panferov | |
| 2016/0112645 A1 | 4/2016 | Amtrup | |

FOREIGN PATENT DOCUMENTS

| | | |
|---|---|---|
| KR | 2004-0046555 A | 6/2004 |
| KR | 10-0724432 B1 | 5/2007 |
| WO | WO 2003/047208 A1 | 6/2003 |
| WO | WO 2005/066907 A1 | 7/2005 |

OTHER PUBLICATIONS

Mattes, Notice of Allowance, U.S. Appl. No. 15/014,690, dated Sep. 9, 2016, 8 pgs.

Mattes, Office Action, U.S. Appl. No. 13/755,622, dated Jun. 10, 2016, 15 pgs.

Mattes, Office Action, U.S. Appl. No. 13/750,969, dated May 6, 2016, 17 pgs.

Mattes, Final Office Action, U.S. Appl. No. 13/755,622, dated Dec. 13, 2016, 14 pgs.

Mattes, Notice of Allowance, U.S. Appl. No. 15/014,690, dated Dec. 23, 2016, 6 pgs.

Abulafia, Office Action, U.S. Appl. No. 15/059,767, dated May 12, 2016, 16 pgs.

Mattes, Final Office Action, U.S. Appl. No. 13/750,969, dated Jan. 12, 2017, 20 pgs.

Abulafia, Office Action, U.S. Appl. No. 12/502,269, dated Apr. 20, 2015, 23 pgs.

Abulafia, Final Rejection, U.S. Appl. No. 12/502,269, dated Jun. 22, 2012, 22 pgs.

Abulafia, Office Action, U.S. Appl. No. 12/502,269, dated Dec. 15, 2011, 16 pgs.

Abulafia, Notice of Allowance, U.S. Appl. No. 12/502,269, dated Oct. 9, 2015, 8 pgs.

Abulafia, Office Action, U.S. Appl. No. 13/275,203, dated Sep. 16, 2013, 13 pgs.

Abulafia, Final Rejection, U.S. App. No. 13/275,203, dated Apr. 1, 2014, 20 pgs.

Abulafia, Final Rejection, U.S. Appl. No. 13/275,203, dated Jan. 7, 2015, 18 pgs.

Abulafia, Notice of Allowance, U.S. Appl. No. 13/275,203, dated Nov. 23, 2015, 11 pgs.

Mattes, Office Action, U.S. Appl. No. 13/750,969, dated Apr. 13, 2015, 15 pgs.

Mattes, Office Action, U.S. Appl. No. 13/750,969, dated Aug. 26, 2015, 16 pgs.

Mattes, Office Action, U.S. Appl. No. 13/755,622, dated Mar. 4, 2015, 8 pgs.

Mattes, Final Office Action, U.S. Appl. No. 13/755,622, dated Oct. 16, 2015, 11 pgs.

Simon, Know the latest credit card fraud techniques, Nov. 2, 2006, 2 pgs.

Abulafia, Office Action, U.S. Appl. No. 13/275,203, dated Jul. 23, 2014, 22 pgs.

Abulafia, Notice of Allowance, U.S. Appl. No. 15/059,767, dated Aug. 2, 2017, 11 pgs.

Mattes, Office Action, U.S. Appl. No. 15/432,831, dated Oct. 17, 2018, 37 pgs.

Mattes, Final Office Action, U.S. Appl. No. 15/432,831, dated May 1, 2019, 33 pgs.

Mattes, Notice of Allowance, U.S. Appl. No. 15/464,635, dated Sep. 26, 2018, 7 pgs.

Mattes, Office Action, U.S. Appl. No. 15/464,635, dated Jul. 19, 2018, 8 pgs.

Mattes, Office Action, U.S. Appl. No. 15/593,062, dated Aug. 10, 2018, 15 pgs.

Jumio, Communication Pursuant to Rules 161(1) and 162, EP16713053.3, dated Oct. 11, 2017, 2 pgs.

(56) References Cited

OTHER PUBLICATIONS

Mattes, Notice of Allowance, U.S. Appl. No. 15/432,831, dated Sep. 20, 2019, 9 pgs.
Mattes, Office Action, U.S. Appl. No. 16/195,652, dated Jun. 7, 2019, 11 pgs.
Mattes, Notice of Allowance, U.S. Appl. No. 16/195,652, dated Sep. 30, 2019, 7 pgs.

* cited by examiner

MOBILE PHONE PAYMENT SYSTEM USING INTEGRATED CAMERA CREDIT CARD READER

CROSS REFERENCE TO RELATED APPLICATIONS

This application is a continuation of U.S. patent application Ser. No. 12/502,269 filed Jul. 14, 2009, which claims the benefit of U.S. Provisional Patent Application No. 61/134,665 filed Jul. 14, 2008, both of which are incorporated herein by reference in their entirety.

BACKGROUND

1. Field of the Invention

The present invention generally relates to the field of applications for mobile devices and more particularly to systems and methods for conducting credit card transactions through mobile devices.

2. Discussion of Related Art

Sale points that allow customers to purchase products and services using the customers' credit cards are usually stationary. Credit card based monetary transactions are usually carried out by systems that can either read data from a magnetic strap attached to the card enabling the system to read details of the card for identification or by mechanically inputting the card number and other card details such as the name of the card owner and the expiry date of the card, which are usually printed or engraved on one surface of the card as well as the Card Verification Value Code (CVV or CVC) which is usually printed or engraved in the back surface of the card.

Mobile sale points can be achieved by allowing using mobile devices such as cell phones, PDA devices etc. for managing transactions using customers credit cards.

The following patents and patent applications are incorporated herein by reference in their entirety:

U.S. Patent Publication No. US20050009564 discloses a communication system that enables addition of a function for use of credit card settlement services to a portable information terminal. In this system, if a user brings his credit card close to the portable information terminal, the portable information terminal reads a card ID stored in a contactless IC card provided in the credit card. Then, the card ID is transmitted to a card management system which checks whether or not the card ID is valid. If confirming that the card ID is valid, the card management system instructs the portable information terminal to write the card ID thereto. If the user places an order of a merchandize, the card ID written to the portable information terminal is provided therefrom to use credit card settlement services.

WIPO Publication No. W003047208 discloses a method of transacting financial transactions using a handheld internet network data enabled wireless device. The method comprises: receiving transaction information from the wireless device, forwarding the transaction information to a financial transaction server for processing; receiving information from the transaction server on the successful processing or otherwise of the transaction and sending information on the successful processing or otherwise of the transaction to the wireless device. The steps of receiving and sending information to and from the wireless device are conducted using an internet network data protocol. The wireless device has a unique identifier which is transmitted to the server.

WIPO Publication No. W02005066907 discloses a system in which financial transactions are authorized over a mobile phone by recording the data required for a transaction in a secure database, registering the users phone number, and registering a PIN differing from the users other PINS to authorize a transaction only from the registered phone number. Limitations may be placed on the type of transactions available from various phone systems.

Korean Patent Document No. KR20020011052 discloses a mobile system having a fingerprint sensor added to a conventional internet terminal such as a PDA, a smart phone, a notebook, where the system enables a user to make a credit card payment without a credit card by using a member ID, a password and a fingerprint data. The user purchases a commodity at an affiliated store and makes a credit card payment, the system installed at the store performs steps of making an access to the internet, enabling the user to select a credit card company or a bank, inputting an identification number or payment amount, inputting fingerprint data, requesting an approval to a server of the selected credit card company, receiving the approval result, and printing a payment slip.

BRIEF SUMMARY

According to one aspect of the invention, there is provided a method of conducting credit card transactions through a mobile device of a user, wherein the mobile device comprises an image acquisition unit and a mobile application operated by the mobile device. The method may comprise acquiring an image of a client's credit card, using the image acquisition unit; analyzing data of the image; outputting details of the credit card from the analysis; verifying the output details, wherein the verification is further carried out through the mobile application; verifying authorization of inputted monetary transaction, wherein the mobile application enables verifying the authorization by communicating with the billing center, associated with at least one credit company associated with the credit card over at least one communication network, wherein the communication is carried out by the mobile application using the mobile device; and managing monetary transactions using the verified credit card details.

According to another aspect of the invention, there is provided a system for conducting credit card transactions through mobile devices of a user. The system may comprise (i) at least one mobile device comprising an image acquisition unit enabling to acquire an image of a credit card; (ii) a mobile application enabling to retrieve image data of an image of a credit card of a client acquired by the image acquisition unit, wherein the mobile application is operated by the mobile device, wherein the mobile application comprises (1) a communication module enabling to communicate with a billing center associated with at least one credit company of the credit card using the mobile device, over at least one communication network and (2) a transactions module enabling to conduct monetary transactions through the billing center, wherein the transactions module enables verifying authorization for executing each transaction at the billing center; and (iii) an image analysis module enabling to analyze the acquired image data of the credit card to output credit card details.

BRIEF DESCRIPTION OF THE DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

DETAILED DESCRIPTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In other modules, well-known methods, procedures, components and circuits have not been described in detail so as not to obscure the teachings of the present disclosure.

The present invention, in some embodiments thereof, provides a system and a method for conducting credit card transactions through mobile devices of a user. The system and method enable a user, which may be a salesman, trader, retailer or any other user of the mobile device to conduct and manage credit card based monetary transactions by extracting details of the credit card such as the credit card number, expiry date and the name of owner of the card form an image (e.g., photographed image) of the credit card surface including those details. Managing of the monetary transaction may include enabling the user to input details of the transaction (e.g., monetary sum, payment conditions etc.) and conducting of the actual transaction via a remote billing center.

Credit cards often include one side that has a magnetic strip attached and the CVV details and another side having details such as the number of the card, expiry date and name of the owner engraved, protruding or printed upon the surface of the card.

The owner of the credit card may be any client wishing to purchase a product or a service from the user.

The invention allows salesmen or other service providers who are mobile and do not sell at a predefined point of sale to carry out transactions wherever they are using their mobile devices.

The mobile device may be any device that is mobile such as a cellular phone, a personal digital assistance device (PDA), a laptop, etc. as known in the art, that includes means for acquiring an image (e.g. a 2D photograph) of the client's credit card one or mores sides that include the credit card details.

The acquired image is then analyzed to extract the details therefrom using any known in the art mechanism for identifying the details required, such as, for example, Optical Characters Recognition techniques enabling to recognize characters from a 2D image.

The extracted details may then be verified by the system and once verified a transaction process may be executed between the client and the user.

Figure 1:
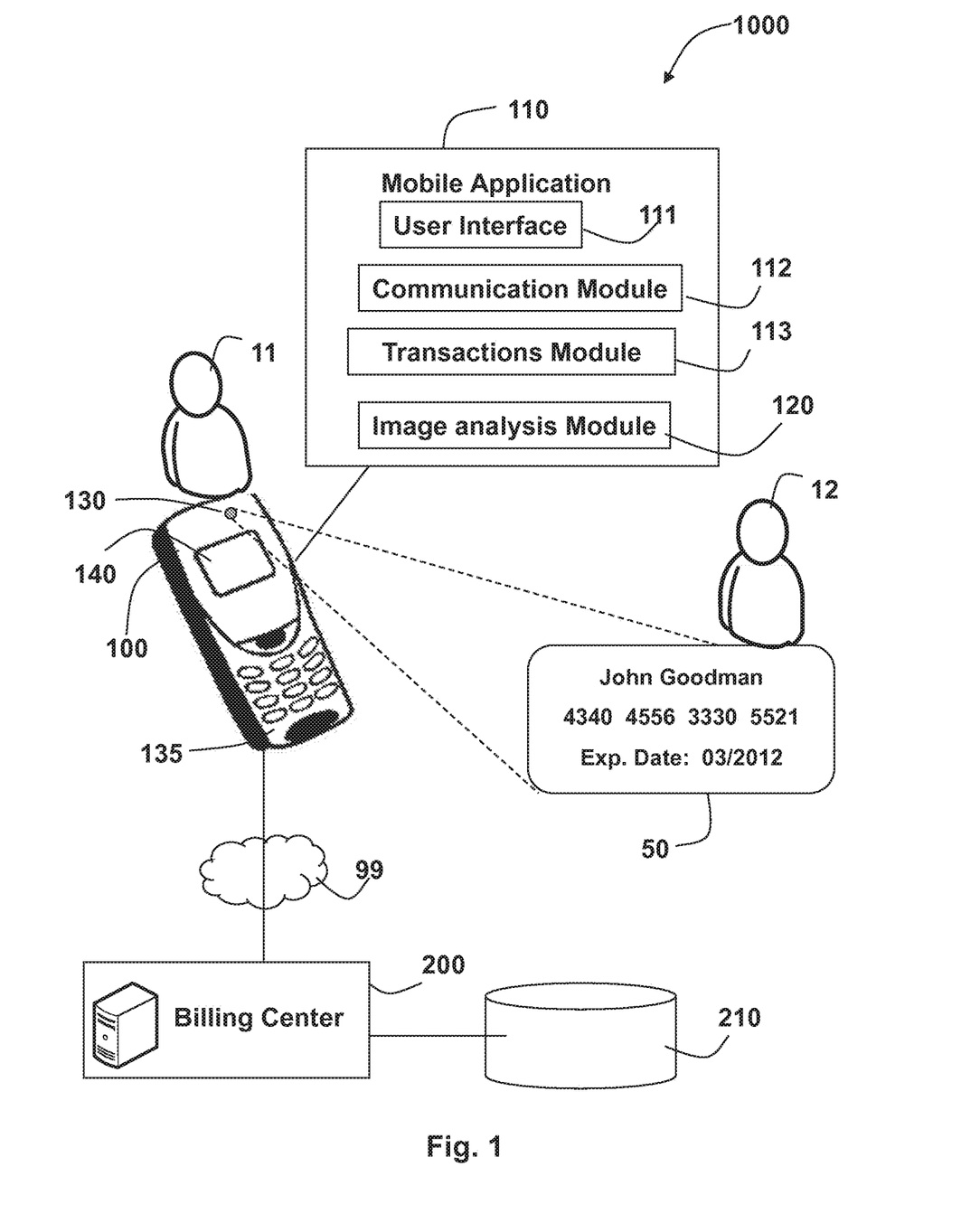
FIG. 1 is a block diagram, schematically illustrating a system for conducting credit card transactions through a mobile device of a user, according to some embodiments of the invention.

FIG. 1 is a block diagram, schematically illustrating a system 1000 for conducting credit card transactions through a mobile device 100. System 1000 may comprise mobile device 100 of a user 11; and a mobile application 110 operated by mobile device 100 and installed therein.

Mobile device 100 may comprise:

an image acquisition unit 130 (e.g. a stills and/or a video camera) enabling to acquire images (such as an image of a credit card 50 of a client 12 placed in front image acquisition unit 130);

mobile application 110 installed therein and operated thereby;

a keypad 135; and a screen 140.

According to embodiments, mobile application 110 may comprise a user interface 111; a communication module 112; a transactions module 113; and an image analysis module 120.

According to embodiments, communication module 112 may enable communicating with a billing center 200, which is associated with at least one credit company of credit card 50 of client 12 using mobile device 100 for communicating over at least one communication network 99. Billing center 200 may be a computerized system holding information relating to clients accounts, billing conditions and history, transactions history, personal and other details of each of the clients and of each credit card associated with billing center 200.

Billing center 200 may be associated with one or more credit companies enabling to retrieve data from one or more databases 210 including this information.

According to embodiments, transactions module 113 may enable managing and conducting monetary transactions through billing center 200, where transactions module 113 enables verifying authorization for executing each transaction at billing center 200, where billing center 200 retrieves data from database 210 to check authorization of a transaction according to predefined authorization rules.

According to embodiments, image analysis module 120 enables analyzing the acquired image data of credit card 50 to output credit card details such as, for example, the number of the credit card, expiry date, name of the credit card owner, type of card (from a logo presented on the surface of the card), or any details that are represented upon the card as known in the art.

According to embodiments illustrated in FIG. 1 image analysis module 120 may be operated by mobile application 110 as a part of application 110, ran by mobile device 100.

According to some embodiments, billing center 200 may comprise a computerized system enabling to receive data from mobile device 100 and store and retrieve data from one or more databases such as database 210 comprising accounts details of credit cards holders, and process the retrieved data.

According to some embodiments, image acquisition unit 130 may further comprise an autofocus mechanism enabling automatic focusing and defocusing over the object which image is acquired, thereby enabling to automatically focus the camera to acquire optimal image of credit card 50, when credit card 50 is placed in front of the image acquisition unit 130.

According to embodiments, user interface 111 may enable a user 11 of mobile device 100 to view details of credit card 50 outputted from the image analysis, confirm the outputted details, input transaction details (e.g. monetary sum of purchase, payments conditions and layout, currency, etc.) and view transaction related data, using screen 140 and keypad 135 of mobile device 100.

According to some embodiments, the image analysis may include:

identifying segments of the credit card details according to predefined segments by identifying area segments of the credit card surface from the acquired image, where each segment includes characters relating to the credit card details (e.g. segment of each four numbers of the card number, another segment of the expiry date of the card and another segment of the name of the card holder);

recognizing the characters in each identified segment (e.g. using a predefined optical characters recognition (OCR) processing technique);

verifying whether all segments are identified and recognized;

transmitting the recognized details of all identified segments for client confirmation to enable the client to view the identified segments and the details recognized therein and to confirm the segments that are correct and recognized; and enabling to automatically repeat the process of acquiring a new image of credit card 50 to enable identification of segments that were previously unidentified in the analysis.

According to embodiments, the image data of each acquired image may be temporarily stored at the memory of mobile device 100 where these details may be automatically deleted from the memory after a short predefined while (e.g. once the transaction session is completed or terminated) for security reasons. The temporarily stored data may be encrypted and/or compressed for storage and security purposes.

Figure 2:
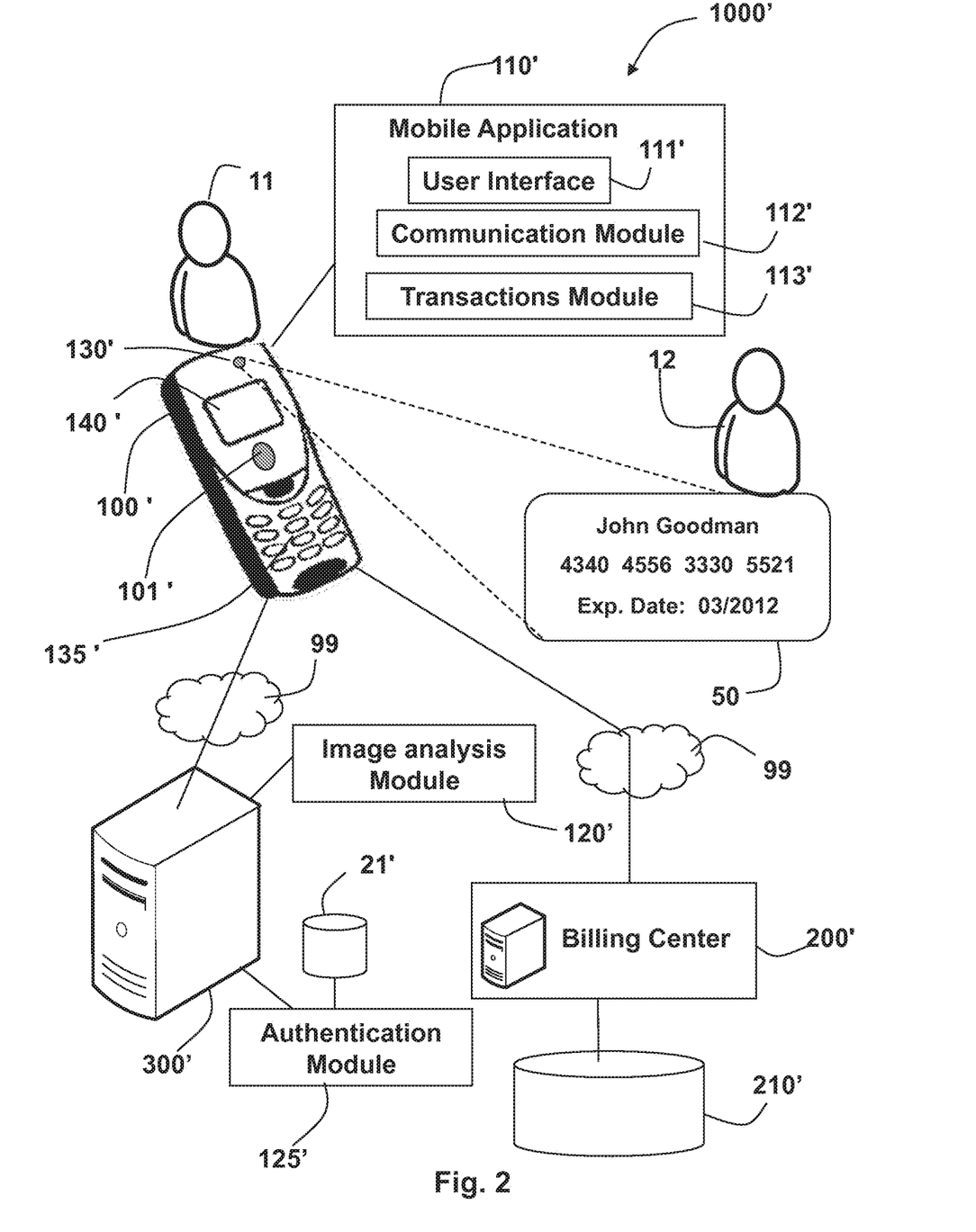
FIG. 2 is a block diagram, schematically illustrating a system for conducting credit card transactions through a mobile device of a user, according to other embodiments of the invention.

FIG. 2 is a block diagram schematically illustrating a system 1000' for conducting credit card transactions through a mobile device of a user, according to other embodiments of the invention.

According to these embodiments, system 1000' may comprise a mobile device 100' of user 11; a mobile application 110' operated by mobile device 100' and installed therein; and a remote server 300' enabling to operate an image analysis module 120' and an authentication module 125' installed therein.

Mobile device 100' may comprise:

an image acquisition unit 130' enabling to acquire images (such as an image of a credit card 50 of a client 12 placed in front image acquisition unit 130);

mobile application 110' installed therein and operated thereby;

a keypad 135'; and a screen 140'.

According to these embodiments, mobile application 110' may comprise a user interface 111', a communication module 112' and a transaction module 113', which may be operated and function in a similar manner to user interface 111, communication module 112 and transaction module 113 according to embodiments described above.

Communication module 112' may enable communicating with a billing center 200', which is associated with at least one credit company of a credit card 50 of a client 12 using mobile device 100' for communicating over at least one communication network such as a wireless communication network 99. Billing center 200' may be a computerized system holding information relating to clients accounts, billing conditions and history, transactions history, personal and other details of each of the clients and of each credit card associated with billing center 200'.

Billing center 200' may be associated with one or more credit companies enabling to retrieve data from one or more databases 210' including this information.

According to embodiments, transactions module 113' may enable managing and conducting monetary transactions through billing center 200', where transactions module 113' enables verifying authorization for executing each transaction at billing center 200', where billing center 200' retrieves data from database 210' to check authorization of a transaction according to predefined authorization rules.

According to embodiments illustrated in FIG. 2, image analysis module 120' may be a software application separated from mobile application 110', which may be operated by remote server 300' enabling to analyze acquired images of credit cards 50 sent by a multiplicity of users 11. Mobile application 110' may enable transmitting image data of each acquired credit card image to remote server 300', which may further allow storing the images. Remote server 300' may communicate with mobile device 100' over at least one communication network such as wireless communication network 99.

The analysis resulting credit card details of each acquired image may be carried out by image analysis module 120' in a similar manner according to embodiments described above, using OCR techniques and optionally segmentation techniques.

According to embodiments, the system may further comprise authentication module 125', which may be operatively associated with server 300'. Authentication module 125' may enable to authenticate the user in each session. The authentication may be carried out according to each authentication technique known in the art, e.g. by enabling a user to input details through mobile device 100' (e.g., pin code, user name and password etc.), where the input details may be authenticated by authentication module 125'.

According to some embodiments, system 1000' may further enable automatically storing the acquired images of credit cards and other related details for each credit card session in a designated database 20' through server 300' forth further ratification and monitoring of transaction sessions.

According to some embodiments, mobile device 100' may further comprise one or more biometric input device 101' enabling to acquire at least one biometric characteristic of client 12 to enable identification of client 12, where authentication module 125' enables authenticating the user and/or the client by biometric identification of the client/user by searching through a biometric database 21' operatively associated with authentication module 125' to identify the inputted biometric characteristics.

Biometric device 101' may include at least one of: a voice recording device enabling to record the voice of client 12 analyze and identify the voice pattern by comparing to voice pattern associated with client's 12 name in biometric database 21'; a fingerprint input device enabling to acquire an image of client's 12 fingerprint of a predefined finger, analyze and identify the acquired fingerprint image by comparing to fingerprint image associated with client's 12 name in biometric database 21'; or any other biometric device and identification technique known in the art.

Figure 3:
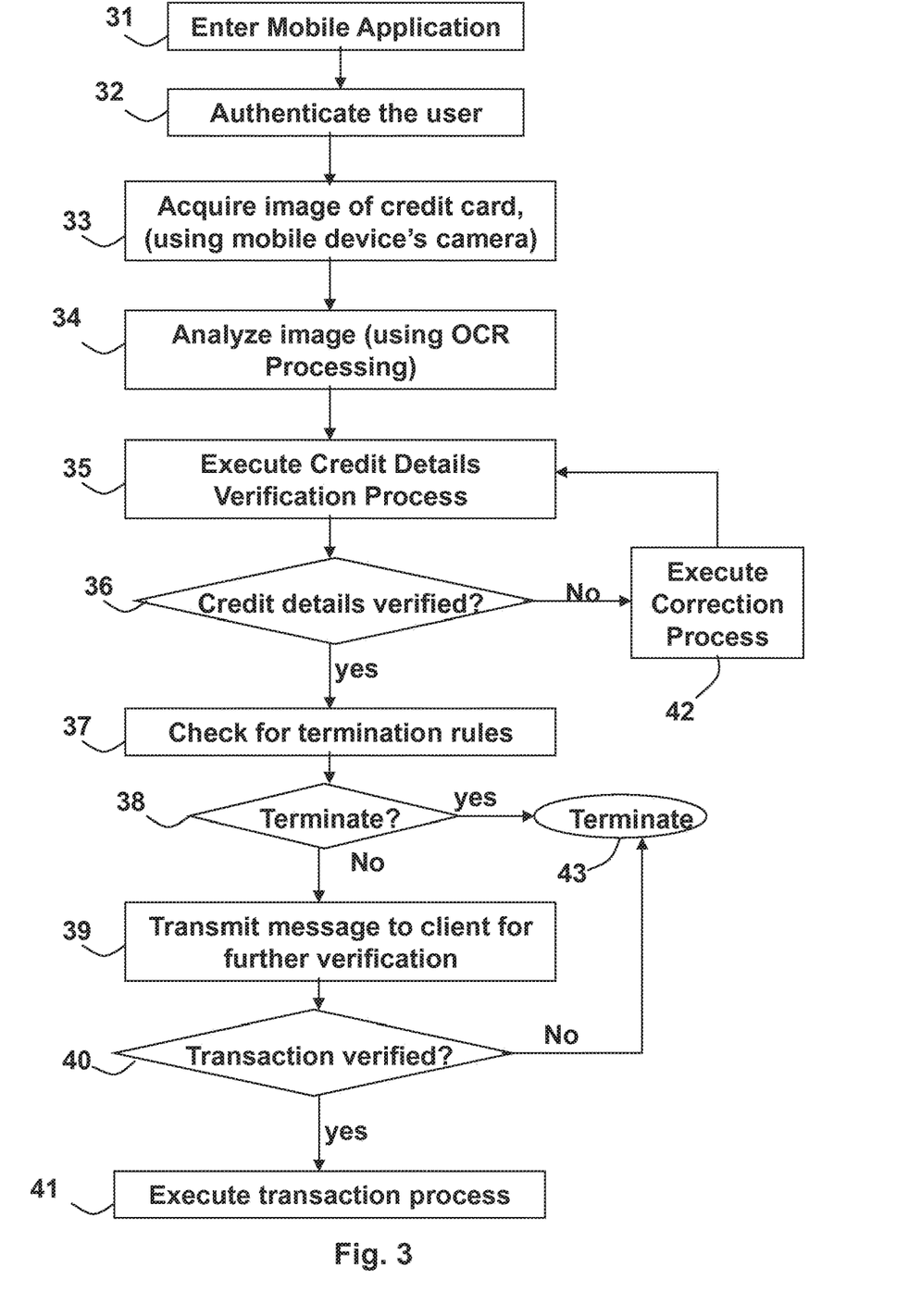
FIG. 3 is a flowchart, schematically illustrating a method of conducting credit card transactions through a mobile device of a user, according to some embodiments of the invention.

FIG. 3 is a flowchart, schematically illustrating a method of conducting credit card transactions through a mobile device of a user, according to some embodiments of the invention. The method may comprise:

entering a mobile application, where the user enters the mobile application through his/her mobile device 31 (e.g., by inputting a user identification code and authenticating this code by searching through a predefined database including user's identification codes and authorization statuses);

authenticating the user 32;

acquiring an image of a client's credit card (an image of the card side that contains the card details and/or the other side containing the CVV details), using the image acquisition unit of the mobile device 33;

analyzing data of the image to identify the credit card details 34 such as the credit card holder's name, the credit card number, expiry date and credit card type and company (e.g. by using OCR techniques) outputting the identified details;

executing a verification process for verifying the outputted details 35, where the verification is further carried out through the user's mobile application (and by the user him/herself);

if the credit card details are unverified 36 the system may enable executing a correction process 42, in which the misidentified or missing details can be reacquired (e.g. by repeating steps 33-36);

if the credit card details are verified 36 the system may check for termination conditions according to predefined termination rules 37;

if termination conditions are validated 38, the transaction session may be automatically terminated 43;

if termination is invalid 38, the system may enable transmitting a message to the client/user (e.g. via email, SMS messages etc. as known in the art) for further verification of the credit card details 39; and if a transaction is verified and approved by the client/user 40, the system may execute a transaction process 41 enabling, for example, to conduct a monetary transaction through the user's mobile device (e.g., by inputting the transaction details and confirming it).

The authentication of the user may be carried out by, for example, enabling the user to input authentication details (e.g., code) and authenticating those details using a database including names and statuses of authorized users; by using biometric identification; and/or by using the mobile device's ID (e.g., phone number or IP address) to automatically identify the user.

Figure 4:
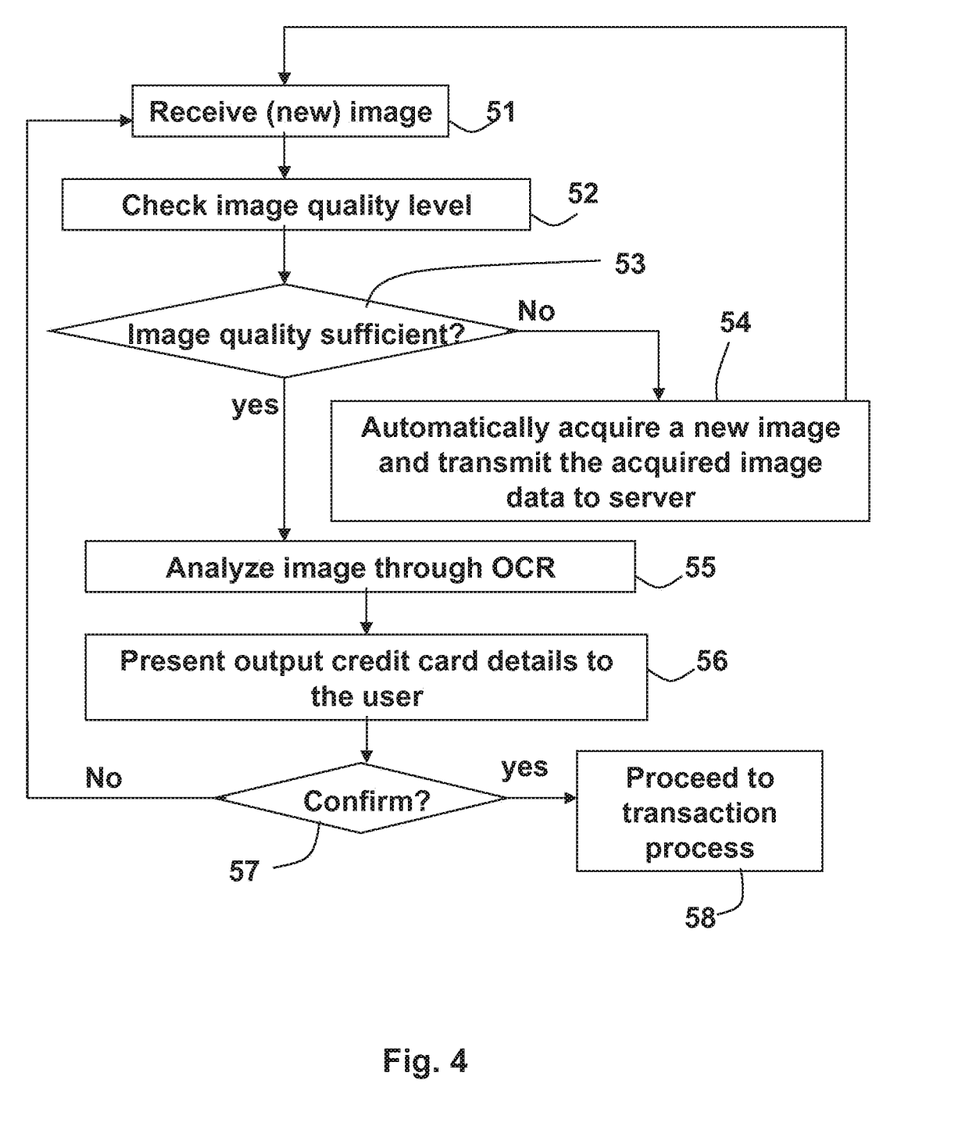
FIG. 4 is a flowchart, schematically illustrating a process of verifying credit card details of a client for conducting transactions through the user's mobile device, according to some embodiments of the invention.

FIG. 4 is a flowchart, schematically illustrating the process of verifying credit card details of the client for conducting transactions through the user's mobile device, according to some embodiments of the invention. The verification process may comprise:

receiving a new acquired image of the credit card side comprising the credit card details 51 from the image acquisition unit;

checking the quality level of the received image 52;

if the quality level is insufficient (according to predefined rules and conditions) 53, automatically acquiring a new image 54 (using the image acquisition unit in the mobile device), transmitting the image data to the image analysis module and repeating steps 51-53).

if the quality level is sufficient (according to predefined rules and conditions) 53 analyzing the received image (e.g. using OCR analysis technique) 55 to identify the details of the credit card;

presenting the identified credit card details to the client and user 56 (e.g. through the screen of the user's mobile device and/or by transmitting a message to the client); and enabling the client and/or user to confirm the presented details 57 to allow proceeding to the transaction process 58 once the details are confirmed.

Figure 5:
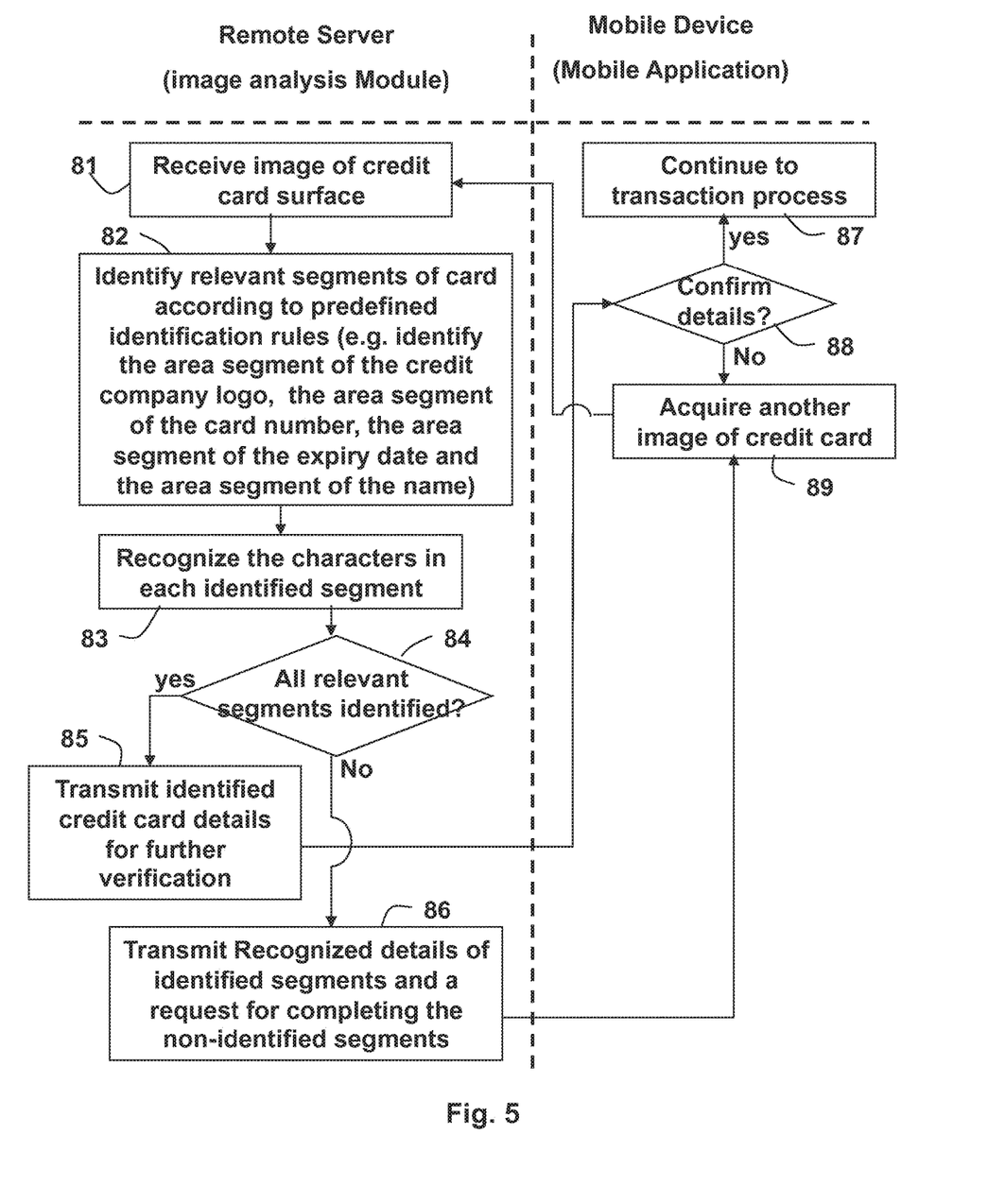
FIG. 5 is a flowchart, schematically illustrating a process of analyzing an image of a credit card using a remote server for carrying out the analysis by segmenting image parts and verifying the details of the client's credit card, according to some embodiments of the invention.

FIG. 5 is a flowchart schematically illustrating a process of analyzing an acquired image of a credit card using a remote server for carrying out the analysis, according to some embodiments of the invention, the analysis process may comprise:

receiving an acquired image of the credit card surface (the side containing the details) 81;

identifying relevant segments of the credit card surface according to predefined identification rules 82 (e.g. identifying the segments containing number-groups where all groups combined ordered from left to right make out the credit card number, the segment containing the expiry date of the card, the segment containing the company's logo including the card type, and the segment containing the name of the card holder);

recognizing the characters in each identified segment 83 (using OCR);

if all segments and the details they contain were identified by the process 84 the identified details may be transmitted from the remote server to the application of the mobile device 85 to allow the client and/or user to confirm those details 88; and if at least one of the segments was unidentified by the process 84, the server may enable transmitting a message to the mobile device indicating the identified segments' details for confirmation and informing the user/client about the unidentified segments 86; and if the details are confirmed, the server may continue to the transaction process 87;

in case some of the segments are unidentified or in case the identified details are not confirmed—the mobile application in the mobile device may require the user to begin the process of acquiring a new image of the same credit card to repeat the above-mentioned steps until all segments are identified and all details recognized 89 or correcting the data manually.

According to some embodiments, if the automated process of image quality check returns as insufficient (see step 53) for several attempts above a predefined threshold of attempts number—the system may terminate the automated session and output a message to the user through one or more messaging services (such as through the user interface of the mobile application) requiring to restart the entire process by acquiring a new image of the credit card.

Figure 6:
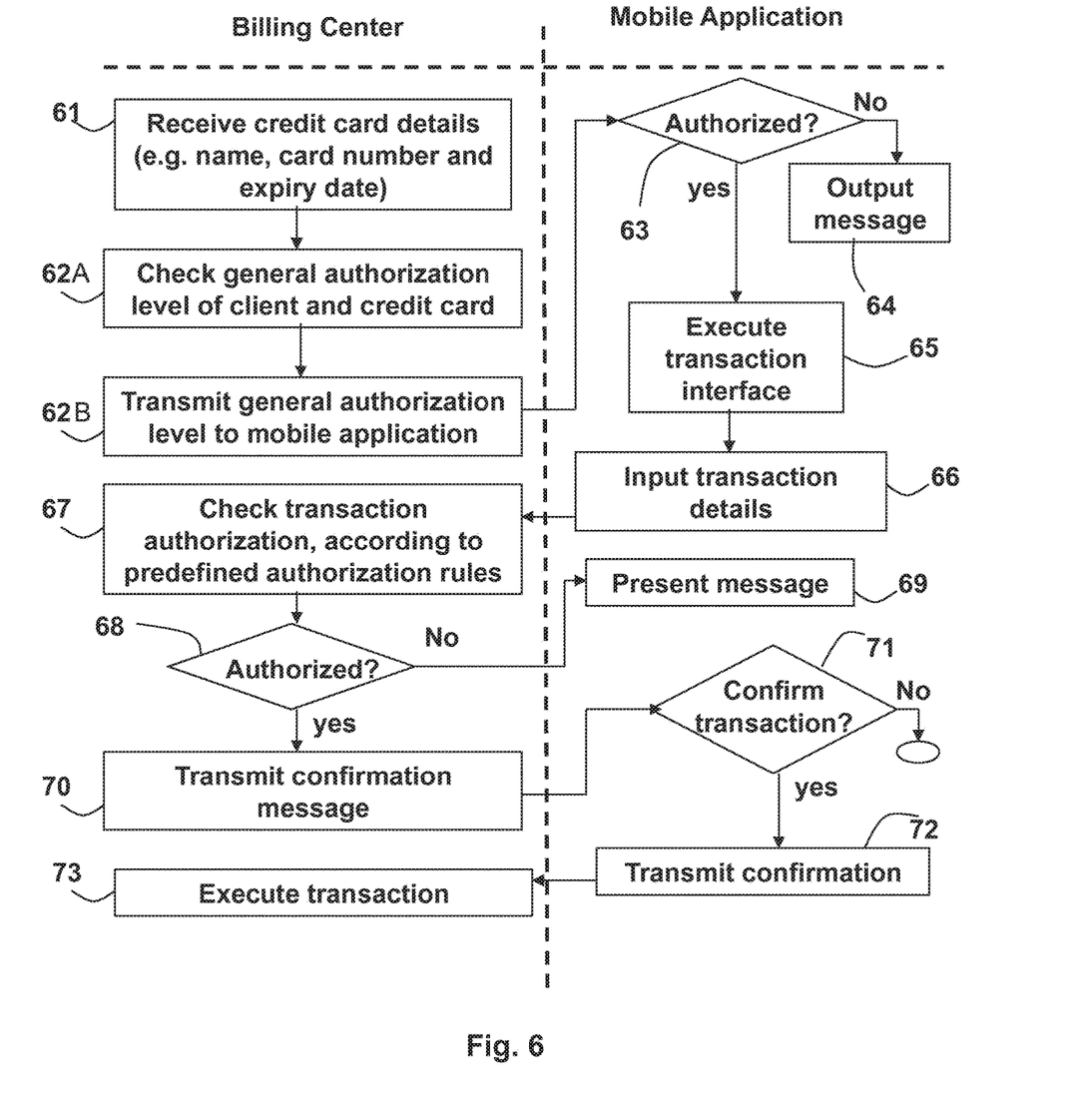
FIG. 6 is a flowchart, schematically illustrating a process of conducting a credit card transaction, according to some embodiments of the invention.

FIG. 6 is a flowchart, schematically illustrating the process of conducting a credit card monetary transaction, according to some embodiments of the invention. The transaction process may comprise:

receiving details of the credit card (e.g. name of the holder, number, expiry date, company and type of credit card, and/or CVV) 61, where the billing center receive the details from the mobile application using the mobile device to transmit the details to the billing center;

checking a general authorization level of the client 62A (this authorization is not related to the type and details of the transaction but to the general authorization of the client to conduct credit card transactions);

transmitting the resulting general authorization to the mobile application 62B;

if the client is unauthorized 63, the application may automatically output and present a suitable message informing the user that no transaction can be approved with this credit card 64;

if the client id authorized 63, a transaction interface is executed by the mobile application 65;

inputting transaction details 66, where the transaction interface allows the user to input the transaction details (e.g. monetary sum, payments conditions, date of transaction, specification of the supplied service/goods etc.);

once the inputted transaction details are received by the billing center, the billing center may check the transaction authorization verifying authorization of inputted monetary transaction 67;

if the transaction is authorized 68, the billing center transmits a confirmation message to the mobile application 70 for final confirmation (the confirmation message may comprise, for example, the details of the transaction);

if the user/client confirms the transaction 71, the mobile application may automatically transmit the confirmation to the billing center 72, where the transaction is then executed 73, where the billing center conducts the monetary transactions using the verified credit card details and the transaction details.

The inputting of the transaction details may be carried out before, during or after the verification process or even prior to the acquiring of the credit card image, depending on the system's definitions.

If the transaction is not authorized 68, a predefined message is presented to the user/client 69.

Figure 7:
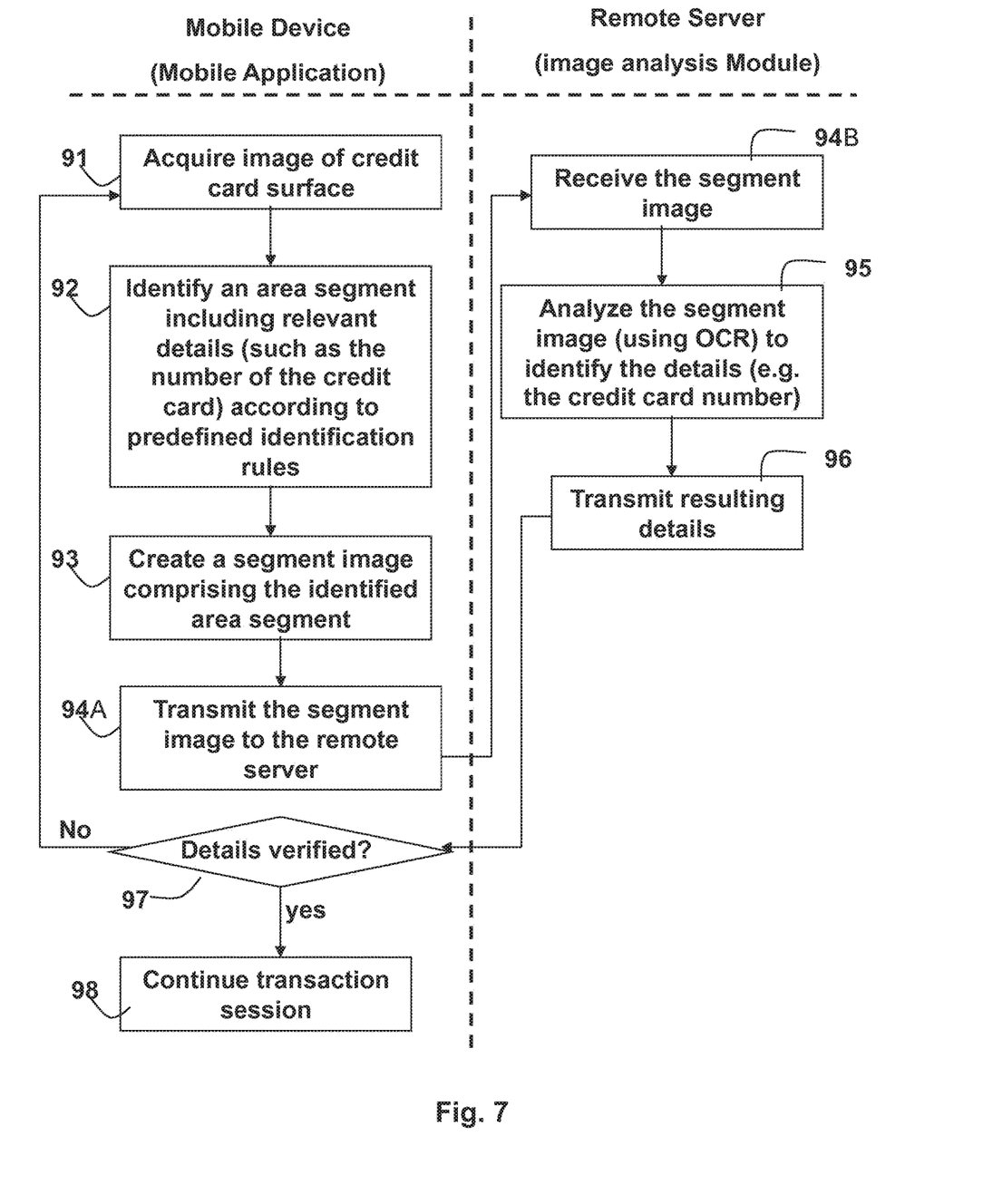
FIG. 7 is a flowchart, schematically illustrating a process for acquiring an image of a segment of the credit card comprising relevant details for analyzing segments in a remote server, according to some embodiments of the invention.

FIG. 7 is a flowchart, schematically illustrating a process for acquiring an image of a segment of the credit card comprising relevant details for analyzing segments in the remote server, according to some embodiments of the invention. The process may comprise:

acquiring an image of the client's credit card surface 91 using the image acquisition unit at the user's mobile device (e.g. the user's mobile phone camera);

identifying at least one segment area in the acquired image of the credit card surface that includes relevant details of the credit card (such as the area that includes the number of the credit card), where the mobile application enables the identification of the segment area according to predefined identification rules (e.g. according to a predefined identification algorithm) 92;

creating an image of the segment area including the segment area 93, where the mobile application carries out the creation of the segment image;

transmitting the created segment image of the segment area to the image analysis module, which is operated by and installed at the remote server 94A;

receiving the transmitted segment image 94B, where the image analysis module (in the remote server) receives the segment image transmitted by the mobile device;

analyzing the received image of the segment area to identify and recognize the details of the credit card (e.g. credit card number) 95 carried out by the image analysis module;

transmitting the resulting details to the mobile device for further verification of the details 96;

if the details are verified 97 (e.g. by the client), the mobile application enables continuing the transaction session for conducting the transaction through the transaction process 98; and if the details are unverified 97, the process may begin again directing the system to repeat steps 91-98 or terminate the session altogether.

In the above description, an embodiment is an example or implementation of the inventions. The various appearances of "one embodiment," "an embodiment" or "some embodiments" do not necessarily all refer to the same embodiments.

Figure 8:
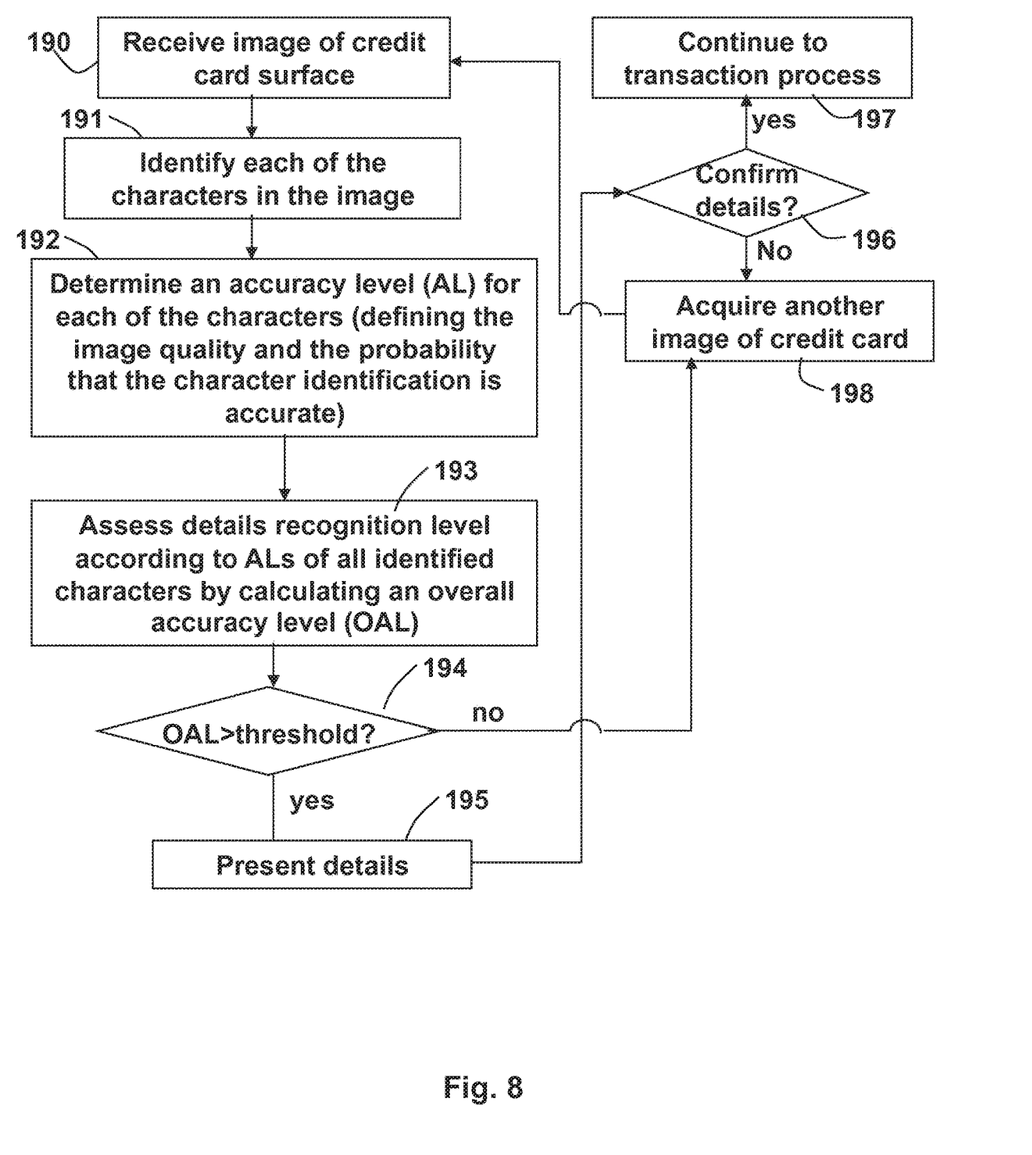
FIG. 8 is a flowchart, schematically illustrating a verification process for verifying the details of a client's credit card, according to some embodiments of the invention.

FIG. 8 is a flowchart, schematically illustrating a verification process for verifying the details of the credit card, according to some embodiments of the invention. The verification process may comprise:

receiving an image of the credit card surface comprising the relevant details 190; identifying each of the characters in the image (using OCR) 191;

determining an accuracy level (AL) for each of the characters according to predefined rules (e.g. using image analysis and shape recognition) defining the quality of the character's image and the probability that the character identification is accurate 192;

assessing details recognition level according to the determined accuracy levels of all identified characters, according to predefined rules (e.g. by calculating an overall accuracy level (OAL) 193;

checking whether the OAL exceeds a predefined threshold OAL 194; if the OAL exceeds the threshold OAL—the resulting details may be presented to the user and/or client 195;

a confirmation of the presented details may be required 196;

if the details are confirmed—the system may enable continuing to further manage the transaction 197; and if the details are either not confirmed or the OAL does not exceed the threshold, the system may enable automatically repeating the image acquisition and the verification process 198.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of conducting credit card transactions through a device including an image acquisition unit, a processor, a memory and a display, the method comprising:

receiving an authentication communication indicative of whether authentication details for a user of the device are valid;
acquiring an image of a credit card using the image acquisition unit subsequent to receiving the authentication communication, when the authentication communication is indicative of valid authentication details;
identifying at least one segment area in the acquired image that includes one or more credit card details;
creating an image of the at least one identified segment area;
extracting at least one of the one or more credit card details from the image of the at least one identified segment area, wherein the extracting recognizes one or more characters identified within the at least one identified segment area; and
communicating at least one of the one or more characters identified within the at least one identified segment area to a billing center associated with the credit card.

2. The method of claim 1, further comprising presenting the extracted credit card details on the display in association with a monetary transaction.

3. The method of claim 1, further comprising receiving an input indicative of a monetary transaction.

4. The method of claim 3, wherein the input is received through one of a user interface provided with the device and communication unit provided with the device.

5. The method of claim 1, further comprising receiving an input from a user indicative of assent to a monetary transaction using the credit card details.

6. The method of claim 1, wherein communicating the at least one identified characters to the billing center includes requesting authorization of a monetary transaction, and receiving feedback from the billing center, including at least one of an indication authorizing the monetary transaction and an indication declining the monetary transaction.

7. The method of claim 1, wherein extracting the at least one credit card details includes applying an optical character recognition technique for identifying at least one of a credit card number, an expiration date, a card verification value and a name of a card holder.

8. The method of claim 1, further comprising:
determining whether the credit card details have been successfully extracted; and
acquiring a new image of the credit card in response to determining that the credit card details were not successfully extracted from the previously acquired image.

9. The method of claim 8, wherein acquiring a new image includes prompting a user to present the credit card again.

10. The method of claim 1, wherein authenticating the user includes obtaining biometric information from the user.

11. The method of claim 1, further comprising storing the acquired image of the credit card.

12. The method of claim 11, further comprising encrypting the acquired image of the credit card.

13. The method of claim 12, further comprising storing the encrypted image in the memory, and/or transmitting the encrypted image to the third party.

14. The method of claim 1, further comprising encrypting at least some of the credit card details.

15. The method of claim 14, further comprising storing the encrypted credit card details in the memory, and/or transmitting the encrypted credit card details to the third party.

16. The method of claim 1, further comprising:
transmitting at least a portion of the image of the credit card to a remote server; and receiving from the remote server at least one of the credit card details and verification of a completed transaction using the credit details extracted from the image.

17. The method of claim 1, wherein extracting the credit card details includes:
   identifying at least some of the characters in the image;
   determining the accuracy level for at least some of the recognized characters;
   assessing a recognition level according to the determined accuracy levels; and
   at least one of repeating the image acquisition and credit card detail extraction, and providing feedback to a user in response to determining that the recognition level is below a threshold.

18. The method of claim 1 further comprising deleting the acquired image of the credit card and the at least one of the extracted credit card details in response to communicating the at least one of the extracted credit card details to the billing center associated with the credit card.

19. A non-transitory computer readable storage medium storing one or more instructions configured for execution by one or more processors of a device, wherein the one or more instructions include instructions for:
   receiving an authentication communication indicative of whether authentication details for a user of the device are valid;
   acquiring an image of a credit card using the image acquisition unit subsequent to receiving the authentication communication, when the authentication communication is indicative of valid authentication details;
   identifying at least one segment area in the acquired image that includes one or more credit card details;
   creating an image of the at least one identified segment area;
   extracting at least one of the one or more credit card details from the image of the at least one identified segment area, wherein the extracting recognizes one or more characters identified within the at least one identified segment area; and
   communicating at least one of the one or more characters identified within the at least one identified segment area to a billing center associated with the credit card.

20. A device comprising:
an image acquisition unit;
a processor configured to at least execute instructions;
a transceiver configured to transmit and receive data communications; and
a memory storing instructions configured for execution by the processor, including instructions for:
   receiving an authentication communication indicative of whether authentication details for a user of the device are valid;
   acquiring an image of a credit card using the image acquisition unit subsequent to receiving the authentication communication, when the authentication communication is indicative of valid authentication details;
   identifying at least one segment area in the acquired image that includes one or more credit card details;
   creating an image of the at least one identified segment area;
   extracting at least one of the one or more credit card details from the image of the at least one identified segment area, wherein the extracting recognizes one or more characters identified within the at least one identified segment area; and
   communicating at least one of the one or more characters identified within the at least one identified segment area to a billing center associated with the credit card.

* * * * *

UNITED STATES PATENT AND TRADEMARK OFFICE
CERTIFICATE OF CORRECTION

PATENT NO. : 10,558,967 B2  
APPLICATION NO. : 15/005836  
DATED : February 11, 2020  
INVENTOR(S) : Abulafia et al.

Page 1 of 1

It is certified that error appears in the above-identified patent and that said Letters Patent is hereby corrected as shown below:

In the Claims

Claim 6, Column 12, Line 32, please delete "one identified" and insert --one of the one or more identified--.

Signed and Sealed this  
Twenty-sixth Day of May, 2020

Andrei Iancu  
*Director of the United States Patent and Trademark Office*